United States Patent
Lim (10) Patent No.: US 9,473,997 B2
(45) Date of Patent: Oct. 18, 2016

(54) METHOD FOR OFFLOADING DATA IN WIRELESS COMMUNICATION SYSTEM AND APPARATUS FOR SAME

(71) Applicant: LG ELECTRONICS INC., Seoul (KR)

(72) Inventor: Jaewon Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 14/365,594

(22) PCT Filed: Dec. 27, 2012

(86) PCT No.: PCT/KR2012/011567
§ 371 (c)(1),
(2) Date: Jun. 13, 2014

(87) PCT Pub. No.: WO2013/100629
PCT Pub. Date: Jul. 4, 2013

(65) Prior Publication Data
US 2014/0341038 A1    Nov. 20, 2014

Related U.S. Application Data

(60) Provisional application No. 61/580,624, filed on Dec. 27, 2011.

(51) Int. Cl.
H04J 1/16      (2006.01)
H04W 36/22   (2009.01)
(Continued)

(52) U.S. Cl.
CPC ............. *H04W 36/22* (2013.01); *H04W 28/08* (2013.01); *H04W 84/12* (2013.01)

(58) Field of Classification Search
CPC .... H04W 28/08; H04W 36/22; H04W 84/12
See application file for complete search history.

(56) References Cited

U.S. PATENT DOCUMENTS

2006/0002383 A1 * 1/2006 Jeong .................. H04L 12/10
                                                             370/360
2009/0318124 A1 * 12/2009 Haughn .................. G06F 8/65
                                                             455/418

(Continued)

FOREIGN PATENT DOCUMENTS

KR    20110018235    2/2011
KR    20110047765    5/2011

(Continued)

OTHER PUBLICATIONS

Fujitsu, "DRX based solution for LTE+WiFi offload (power saving mode)" R2-116305, 3GPP TSG-RAN WG2 Meeting #76, 4 pages, dated: Nov. 18, 2011.

(Continued)

*Primary Examiner* — Ayaz Sheikh
*Assistant Examiner* — Hai-Chang Hsiung
(74) *Attorney, Agent, or Firm* — Lee, Hong, Degerman, Kang & Walmey; Jonathan Kang; Michael Monaco (57) ABSTRACT

The present invention relates to a method for offloading data in a wireless communication system for supporting a multiple radio access network and an apparatus for same. Specifically, the method includes the steps of: receiving a message of a connected cell report including an identifier of a wireless local area network (WLAN) access point (AP) to which a terminal is connected via a base station, from the terminal connected to the base station of a cellular network; transmitting scheduling information on a data transmission time to the base station, when data to be transmitted to the terminal is determined to be transmitted via the WLAN AP; and transmitting the data via the WLAN AP to the terminal according to the scheduling information.

6 Claims, 8 Drawing Sheets

(51) Int. Cl.
*H04W 28/08* (2009.01)
*H04W 84/12* (2009.01)

(56) References Cited

U.S. PATENT DOCUMENTS

| | | | | |
|---|---|---|---|---|
| 2010/0304777 | A1* | 12/2010 | Lee | H04W 60/06 455/517 |
| 2011/0111700 | A1* | 5/2011 | Hackett | A01G 25/16 455/41.2 |
| 2011/0170469 | A1 | 7/2011 | Watfa et al. | |
| 2011/0171915 | A1* | 7/2011 | Gomes | H04W 24/10 455/73 |
| 2012/0184242 | A1* | 7/2012 | Li | H04L 63/0815 455/406 |
| 2013/0083661 | A1* | 4/2013 | Gupta | H04W 4/005 370/235 |

FOREIGN PATENT DOCUMENTS

| | | |
|---|---|---|
| KR | 20110092132 | 8/2011 |
| WO | 2011098658 | 8/2011 |

OTHER PUBLICATIONS

PCT International Application No. PCT/KR2012/011567, Written Opinion of the International Searching Authority dated Apr. 19, 2013, 19 pages.

* cited by examiner

METHOD FOR OFFLOADING DATA IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2012/011567, filed on Dec. 27, 2012, which claims the benefit of U.S. Provisional Application Ser. No. 61/580,624, filed on Dec. 27, 2011, the contents of which are all hereby incorporated by reference herein in their entirety.

TECHNICAL FIELD

The present invention relates to a wireless communication system, and more particularly, to a method of offloading data in a wireless communication system supportive of a multiple radio access network and apparatus therefor.

BACKGROUND ART

The standard for WLAN (wireless local area network) technology is being developed as IEEE (institute of electrical and electronics engineers) 802.11 standard. IEEE 802.11a/b uses an unlicensed band on 2.4 or 5 GHz. The IEEE 802.11b provides a data rate of 11 Mbps, while the IEEE 802.11a provides a data rate of 54 Mbps. IEEE 802.11g applies OFDM (orthogonal frequency division multiplexing) on 2.4 GHz to provide a data rate of 54 Mbps. IEEE 802.11n applies MIMO-OFDM (multiple input multiple output-OFDM) to provide a data rate of 300 Mbps for 4 spatial streams. The IEEE 802.11n supports channel bandwidths up to 40 MHz. In this case, a data rate of 600 Mbps is provided.

DISCLOSURE OF THE INVENTION

Technical Task

One object of the present invention is to provide a method of smoothly transceiving data with a user equipment in a wireless communication system, and preferably, in a multiple radio access network supportive wireless communication system and apparatus therefor.

Another object of the present invention is to provide a method of offloading data and apparatus therefor, by which the data transmitted to a user equipment can be transmitted through a WLAN AP (access point) accessed by the user equipment if the user equipment currently communicating through a cellular network is communication-enabled through a WLAN (wireless local area network).

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one aspect of the present invention, provided herein is a method for offloading data in a wireless access system supportive of a multi-radio access network, the method including the steps of receiving, from a user equipment accessing a base station of a cellular network and through the base station, a connected cell report message containing an identifier of a WLAN (wireless local area network) AP (access point) accessed by the user equipment; transmitting, to the base station, scheduling information about a transmission timing of data to be transmitted to the user equipment, when the data is determined to be transmitted to the user equipment through the WLAN AP; and transmitting the data to the user equipment through the WLAN AP in accordance with the scheduling information.

In another aspect of the present invention, in a wireless access system supportive of a multi-radio access network, an apparatus for offloading data includes a transceiving module configured to transceive wire/wireless signals and a processor configured to receive, from a user equipment accessing a base station of a cellular network and through the base station, a connected cell report message containing an identifier of a WLAN (wireless local area network) AP (access point) accessed by the user equipment, transmit, to the base station, scheduling information about a transmission timing of data to be transmitted to the user equipment when the data is determined to be transmitted to the user equipment through the WLAN AP, and transmit the data to the user equipment through the WLAN AP in accordance with the scheduling information.

Preferably, alternatively or additionally, a connection retain request message indicating to retain a connection between the user equipment and the WLAN AP is sent to the WLAN AP.

Preferably, alternatively or additionally, the connection retain request message includes time information for retaining the connection between the user equipment and the WLAN AP.

Preferably, alternatively or additionally, the connection retain request message is transmitted at a period shorter than a WLAN connection expiration time.

Preferably, alternatively or additionally, the connection retain request message further includes a MAC (media access control) address of the user equipment and an association identifier (AID) between the user equipment and the WLAN AP.

Preferably, alternatively or additionally, the method further includes receiving a connection retain response message indicating whether to accept to retain the connection to the user equipment from the WLAN AP in response to the connection retain request message.

Preferably, alternatively or additionally, the identifier of the WLAN AP includes an IP (internet protocol) address of the WLAN AP or a basic service set identifier (BSSID) of the WLAN AP.

In an aspect of the present invention, provided herein is a method for offloading data in a wireless access system supportive of a multi-radio access network, the method including the steps of transmitting, by a user equipment accessing a base station of a cellular network and to a management entity through the base station, a connected cell report message containing an identifier of a WLAN (wireless local area network) AP (access point) accessed by the user equipment, receiving a traffic indication message indicating that data of the user equipment is transmitted through the WLAN AP from the base station, and receiving the data from the management entity through the WLAN AP in accordance with the traffic indication message.

In another aspect of the present invention, provided herein is an apparatus for offloading data in a wireless access system supportive of a multi-radio access network, the apparatus including a transceiving module configured to transceive wire/wireless signals; and a processor configured to transmit, by a user equipment accessing a base station of a cellular network and to a management entity through the base station, a connected cell report message containing an identifier of a WLAN (wireless local area network) AP (access point) accessed by the user equipment, receive a traffic indication message indicating that data of the user equipment is transmitted through the WLAN AP from the base station, and receive the data from the management entity through the WLAN AP in accordance with the traffic indication message.

Preferably, alternatively or additionally, the traffic indication message includes scheduling information about a transmission timing or a transmission period of the data.

Preferably, alternatively or additionally, the traffic indication message is transmitted at a transmission timing or a transmission period of the data.

Preferably, alternatively or additionally, the identifier of the WLAN AP includes an IP (internet protocol) address of the WLAN AP or a basic service set identifier (BSSID) of the WLAN AP.

Advantageous Effects

According to an embodiment of the present invention, data can be smoothly transceived between user equipments in a wireless communication system, and preferably, in a multiple radio access network supportive wireless communication system.

According to an embodiment of the present invention, traffic for a user equipment currently communicating through a cellular network is transmitted through WLAN communication-available for the corresponding user equipment, thereby reducing a load on the cellular network, adjusting a balance of a load on a radio access network, and improving a data transmission rate for the user equipment.

According to an embodiment of the present invention, data is transmitted to a user equipment using WLAN charged relatively cheaper than a cellular network or free-WLAN, thereby enhancing user's satisfaction with charging.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

1. The General of Wireless LAN (WLAN) System Applicable for the Present Invention FIG. 1 is a diagram for one example of a configuration of a WLAN system.

Figure 1:
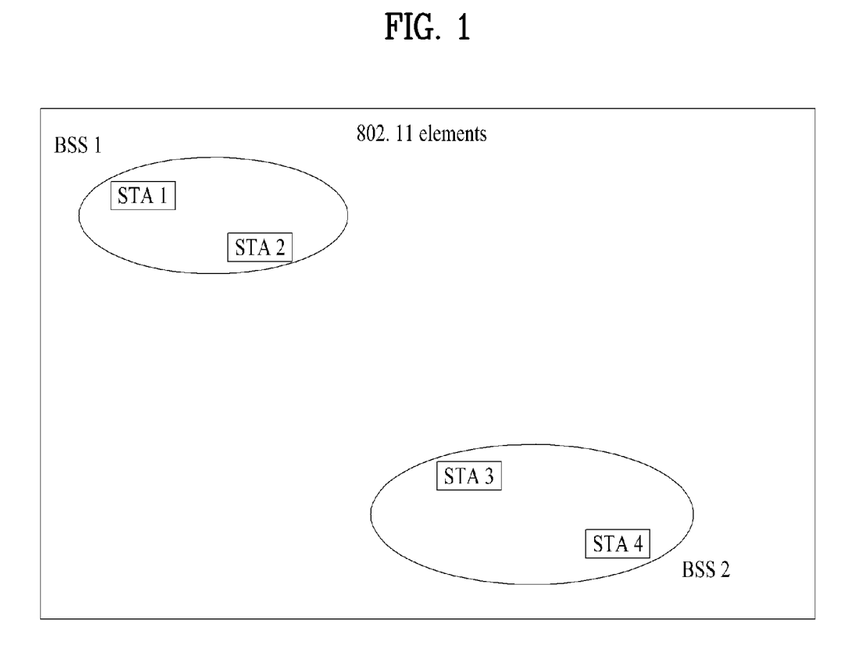
FIG. 1 is a diagram for one example of a configuration of WLAN system.

Referring to FIG. 1, a wireless LAN system includes at least one basic service set (BSS). The BSS is a set of stations (STAs) capable of communicating with each other by being successfully synchronized together. In FIG. 1, 2 BSSs and 2 STAs having accesses each of the BSSs are exemplarily shown. A notation of an oval shape in FIG. 1 indicates a coverage area of the BSS, which is called a basic service area (BSA). If the STA moves over the BSA, the corresponding STA is unable to directly communicate with another STA existing in the BSA.

The BSS is categorized into an independent BSS (IBSS) and an infrastructure BSS. The IBBS is a most basic type of a wireless LAN system. In FIG. 1, IBBS is shown. In the IBBS, STA can communicate with each other in direct. And, a type of such an inter-STA operation is called an ad hoc network.

In order to access BSS, an STA should perform a procedure for synchronization with a base station. In order to access all services of the infrastructure BSS, an STA should be associated with a base station. Such an association procedure is dynamically performed and includes a use of a distribution system service (DSS).

Figure 2:
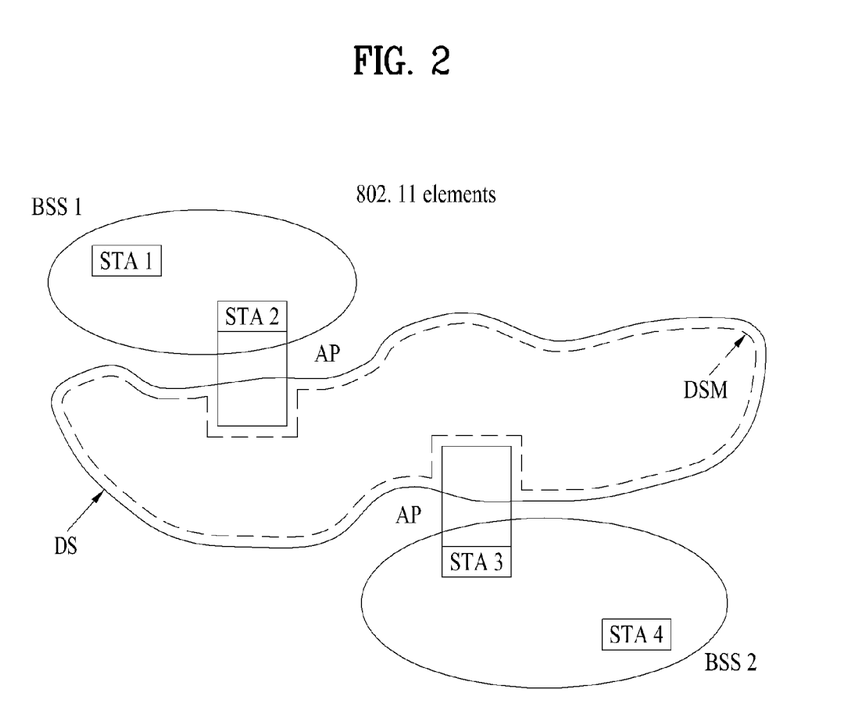
FIG. 2 is a diagram for another example of a configuration of WLAN system.

FIG. 2 is a diagram for another example of a configuration of a WLAN system.

A direct distance supportable between STA and STA may be physically restricted. Such a distance may be sufficient depending on a network. Yet, if such a distance is not sufficient, an extension of a coverage may be required. Hence, BSS may be configured as one component in an extended type of a network configured with a plurality of BSSs. Thus, an architecture component used to mutually connect BSSs to each other is called a distribution system (DS).

The DS is a mechanism for connecting a plurality of APs. It may be unnecessary for the DS to be a network. If the DS is able to provide a prescribed distribution service, no restriction is put on a type of the DS. For instance, the DS may be such a wireless network as a mesh network or a physical structure for connecting APs to each other.

In a wireless LAN system, a distribution system medium (DSM) and a wireless medium (WM) can be logically discriminated from each other. Each logical medium is used for different purpose by a different component of architecture. As DS provides a logical service required for the seamless integration of a plurality of BSSs and the management of an address mapping to a destination, mobility of a device can be supported.

An access point (AP) is an entity that supports an associated STA to access a distribution system through WM. DATA is transported between BSS and DS through the AP. In this case, since every AP can become STA, the AP is an entity having an address as well. Yet, an address used by AP for a communication through WM and an address used by AP for a communication through DSM do not need to be identical to each other.

Figure 3:
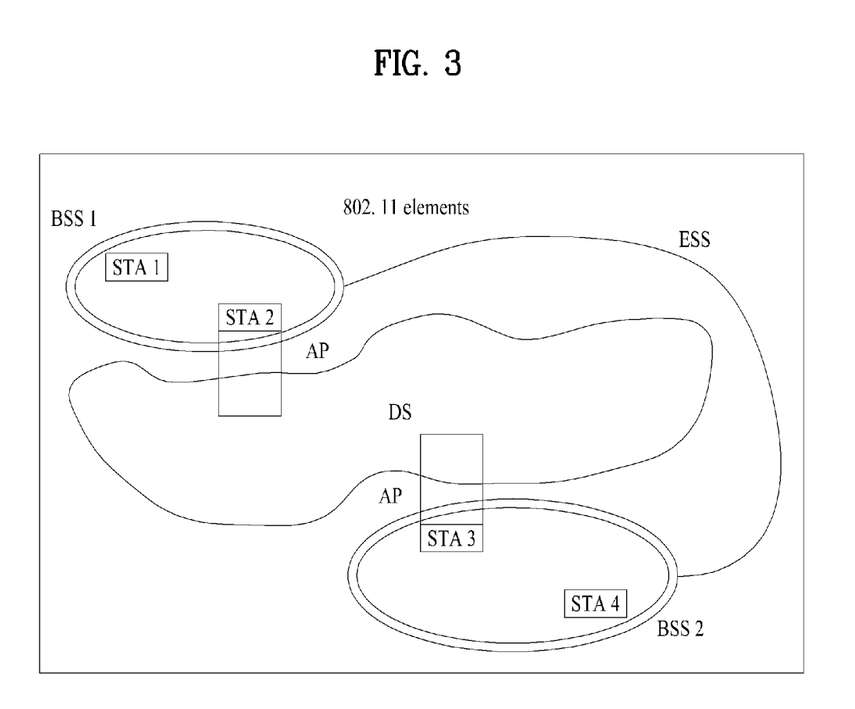
FIG. 3 is a diagram for a further example of a configuration of WLAN system.

FIG. 3 is a diagram for further example of a configuration of a WLAN system.

It is able to establish a wireless network having a random size and complexity using DS and BSS. And, such a network type is called an extended service set (ESS) network. The ESS means a plurality of BSSs connected to each other through DS but does not include the DS. Since the ESS network has the same logical link control (LLC) layer of an IBSS network, STA belonging to ESS can move away from one BSS into another BSS within the same ESS in a manner of being transparent to LLC.

In order to form a physically continuous coverage, BSSs may overlap each other in part. Since no limitation is put on a logical distance between BSSs, the BSSs may not be physically connected to each other. Moreover, in order to avoid unnecessary overlapping, BSSs may not be physically combined with each other. For the case that an ad hoc network operates at a location having an ESS network, the case that wireless system networks configured to physically overlap each other are configured in different structures, respectively, or the case that a plurality of different access or security policies are necessary at the same location, one (or more) IBBS or ESS network can exist as one (or more) ESS network in the physically same space.

The above-described STA is a logical entity that includes a physical layer interface for a medium access control (MAC) and a wireless medium and includes AP STA (AP station) and non-AP STA (non-AP station). Regarding STAs, a mobile user equipment manipulated by a user is a non-AP STA. If simply called an STA, it may indicate a non-AP STA. The non-AP STA may be called such a different name as a terminal, a wireless transmit/receive unit (WTRU), a user equipment (UE), a mobile station (MS), a mobile terminal, a mobile subscriber unit and the like. And, the AP is an entity that provides an STA (i.e., an associated station) associated with the AP with an access to a distribution system (DS) through a wireless medium. The AP may be called an integrated controller, a base station (BS), a Node-B, a base transceiver system (BTS), a femto BS, a site controller or the like.

Figure 4:
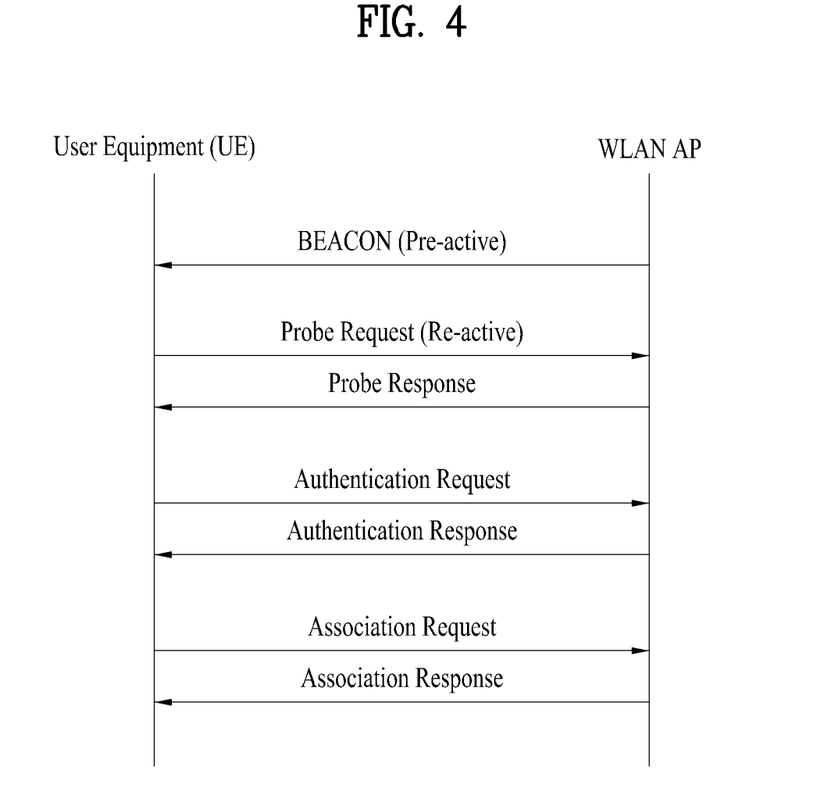
FIG. 4 is a diagram for one example of a procedure for a user equipment to access an AP in WLAN system.

FIG. 4 is a diagram for one example of a procedure for a user equipment to access an AP in WLAN system.

Referring to FIG. 4, an AP periodically generates and transmits a beacon frame of a broadcast type. Having received the beacon frame, a user equipment detects a presence of the access point. The beacon frame can be configured in a manner of including a header, a frame body and a frame check sequence (FCS) and may include such information as a timestamp, a beacon interval, a capability, a service set identifier (SSID), supported rates and the like. The service set identifier is the identifier used to identify a plurality of different basic service sets from each other in a WLAN system and may be called a basic service set identifier (BSSID).

A user equipment receives beacon frames and then confirms a presence of a plurality of accessible APs through the received beacon frames. This is called a passive scanning.

The user equipment selects a specific AP from a plurality of the APs and then transmits a probe request frame to the selected AP.

Meanwhile, a user equipment can save information on previously accessed APs as a profile. Having saved the information on the previously accessed APs as the profile, the user equipment selects an AP from the profile without receiving a beacon frame and is then able to transmit a probe request frame to the selected access point. This is called an active scanning.

The probe request frame can be configured in a manner of including a header, a frame body and a frame check sequence (FCS) and is able to include such information as a service set identifier (SSID) and supported rates and the like. As mentioned in the foregoing description, the service set identifier is the identifier used to identify a basic service set. Any user equipment unaware of a unique service set identifier of a specific basic service set is unable to access the corresponding basic service set. In particular, in order to access a specific basic service set, i.e., an AP, the user equipment sends a service set identifier carried on the probe request frame.

Having received the probe request frame, the AP transmits a probe request frame to the user equipment in response to the probe request frame. The probe response frame can be configured in a manner of including a header, a frame body and a frame check sequence (FCS) and may include such information as a timestamp, a beacon interval, a capability, a service set identifier (SSID), supported rates and the like. Such a series of process is called a search process.

Having completed the search process, the user equipment and the AP perform an authentication process. In particular, after the user equipment has received the probe response frame from the AP, the user equipment transmits an authentication request frame to the AP to make a request for authentication. Subsequently, the AP transmits an authentication response frame to the user equipment, whereby the authentication is established between the AP and the user equipment. The authentication request frame and/or the authentication response frame can be configured in a manner of including a header, a frame body and a frame check sequence (FCS) and may include such information as an authentication algorithm number, an authentication transaction sequence number, a status code and the like.

Having completed the authentication process, the user equipment and the AP perform an association process. In particular, after the authentication has been established between the AP and the user equipment, the user equipment transmits an association request frame to the AP. The association request frame can be configured in a manner of including a header, a frame body and a frame check sequence (FCS) and may include such information as a capability, a listen interval, a service set identifier (SSID), supported rates and the like.

The AP is connected to the user equipment by transmitting an association response frame to the user equipment in response to the association request frame. The association response frame can be configured in a manner of including a header, a frame body and a frame check sequence (FCS) and may include such information as a capability, a status code, an association identifier (AID), supported rates and the like. In this case, the association ID (AID) means a specific identifier given to each user equipment in order to for the AP to identify a plurality of user equipments after the association of the user equipment with the AP.

2. Data Offloading Method

While a communication user equipment capable of communications using both a cellular module communication system and a WLAN communication system is communicating with a base station using the cellular communication system, if the communication user equipment discovers a signal of a communicable WLAN AP, the communication user equipment accesses the WLAN AP and is then able to communicate with the WLAN AP through WLAN. The present invention defines a method as follows. First of all, a mobile communication core network is informed of such a WLAN access situation of the user equipment. Secondly, if it is necessary for the mobile communication core network to transmit data to the user equipment using the WLAN, the data is transmitted to the user equipment through the WLAN under the control of the mobile communication core network. In particular, the present invention defines a method for the user equipment to deliver information of the WLAN AP accessed by the corresponding user equipment to the core network, a method for the core network, which intends to deliver data to the user equipment through the WLAN accessed by the corresponding user equipment, to deliver scheduling information on the corresponding data transmission and traffic indication information to the user equipment through a mobile communication network, and a method for the core network to control the data transmission through the corresponding WLAN.

Hereinafter, in the present specification, assume that a user equipment retains both an RAT (radio access technology) function of communication by a cellular mobile communication system and an RAT function of communication by a WLAN communication system. For clarity of the following description, a transmission of data of a mobile communication network through WLAN is named a cellular traffic offloading.

Figure 5:
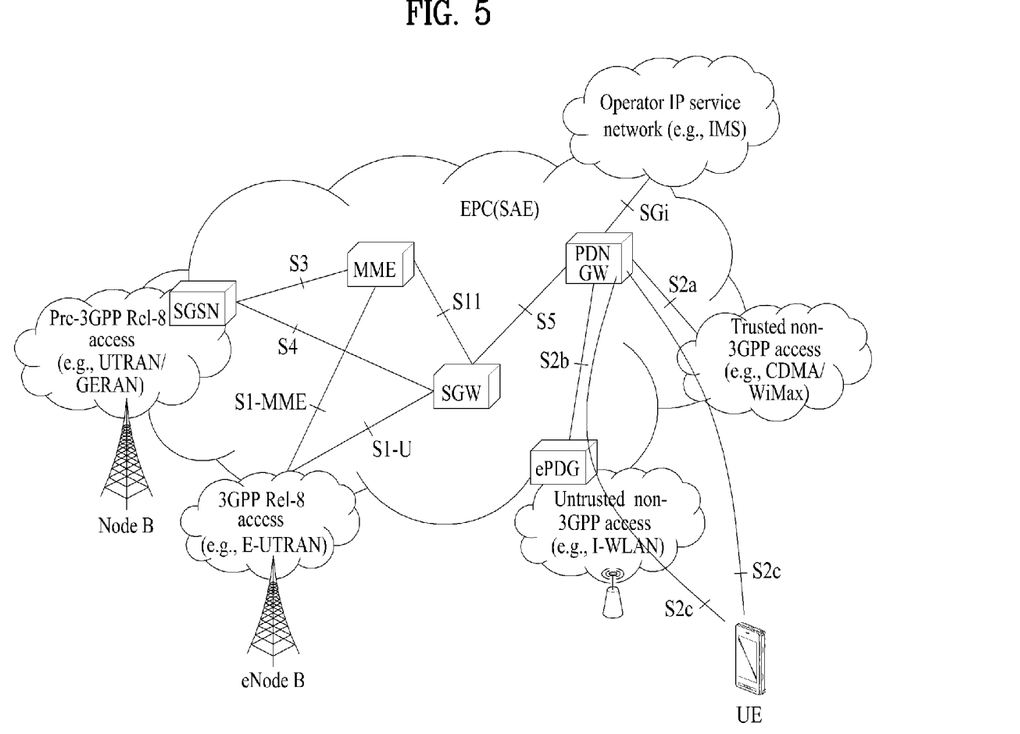
FIG. 5 is a diagram for one example of a network structure applicable for the present invention.

According to the present invention, assume that a location of a WLAN AP is registered by a specific mobile communication service provider, assume that the WLAN AP is controllable by a base station or a mobile communication core network accessed by the base station, and assume that the base station and the WLAN PA are connected to each other through a specific network in a communication-enabled state. FIG. 5 shows one example of a structure of a network applicable to the present invention, by which the present invention is non-limited. And, the present invention is applicable to any wireless communication systems supportive of heterogeneous (multiple) radio access networks.

FIG. 5 is a diagram for one example of a network structure applicable for the present invention.

The 3GPP has established the technology specifications of the $3^{rd}$ generation mobile communication system. In order to cope with various forums related to the $4^{th}$ generation mobile communication and new technologies, the 3GPP has studied LTE/SAE (long term evolution/system architecture evolution) technology as efforts in optimizing and enhancing performance of 3GPP technologies since the end of 2004.

The SAE in progress centering on 3GPP SA WG2 is the study for a network technology for the purposes of determining a structure of a network in parallel with the LTE work of 3GPP TSG RAN and supporting mobility between heterogeneous networks and corresponds to one of the significant standardization issues lately. This work is to evolve the 3GPP system into a system supportive of various radio access technologies based on IP (internet protocol) and has proceeded by targeting an optimized packet based system that minimizes a transmission delay with further enhanced data transmission capability.

SAE upper level reference model defined by 3GPP SA WG2 includes a non-roaming case and a roaming case of various scenarios and its details can refer to the 3GPP standard documents TS 23.401 and TS 23.402. The network structure diagram shown in FIG. 5 corresponds to a schematic reconfiguration of the SAE upper level reference model and shows a schematic structure of EPS (evolved packet system) including EPV (evolved packet core).

The EPC is a core element of SAE (system architecture evolution) for enhancing performance of the 3GPP technologies. The SAE corresponds to a study task for determining a network structure supportive of mobility between various kinds of networks. For instance, the goal of the SAE is to provide an optimized packet-based system capable of supporting various radio access technologies based on IP and providing a further enhanced data transmission capability.

In particular, the EPC is a core network of an IP mobile communication system for 3GPP LTE system and is able to support a packet-based real-time/non-real-time service. In an existing mobile communication system (e.g., $2^{nd}$ generation mobile communication system, $3^{rd}$ generation mobile communication system, etc.), a function of the core network is implemented through 2 distinctive subdomains such as a CS (circuit-switched) subdomain for audio and a PS (packet-switched) subdomain for data. Yet, in the 3GPP LTE system evolved from the $3^{rd}$ generation mobile communication system, the CS subdomains and the PS subdomains are integrated into a single IP domain. In particular, in the 3GPP LTE system, a connection between user equipments having IP capability can be configured through an IP based base station (e.g., eNodeB (evolved Node B)), an EPC, and an application domain (e.g., IMS (IP multimedia subsystem)). In particular, the EPC is the structure mandatory for end-to-end IP service implementation.

The EPC can include various components. In the example shown in FIG. 5, the EPC includes some of the various components such as SGW (Serving Gateway), PDN GW (Packet Data Network Gateway), MME (Mobility Management Entity), SGSN (Serving GPRS (General Packet Radio Service) Supporting Node), and ePDG (enhanced Packet Data Gateway).

The SGW operates as a boundary point between a RAN (Radio Access Network) and a core network and is the component playing a role in maintaining a data path between an eNodeB and a PDN GW. If a user equipment moves across an area served by an eNodeB, the SGW plays a role as a mobility anchor point. In particular, for the mobility within Evolved-UMTS (Universal Mobile Telecommunications System) Terrestrial Radio Access Network defined after E-UTRAN (3GPP Release-8, packets can be routed through the SGW. And, the SGW can play a role as an anchor point for mobility with another 3GPP network (i.e., RAN defined before 3GPP Release-8) (e.g., UTRAN, GERAN (GSM/EDGE (Global System for Mobile Communication/Enhanced Data rates for Global Evolution) Radio Access Network).

The PDN GW (or P-GW) corresponds to a termination end point of a data interface toward a packet data network. The PDN GW is able to support policy enforcement features, packet filtering, charging support and the like. And, the PDN GW can play a role as an anchor point for management of mobility with 3GPP network and non-3GPP network (e.g., an trusteduntrusted network such as I-WLAN (Interworking Wireless Local Area Network), a trusted network such as CDMA (Code Division Multiple Access) network and WiMax).

In the example of the network structure shown in FIG. 5, the SGW and the PDN GW are configured as separate gateways, respectively. Alternatively, the two gateways can be implemented according to a single gateway configuration option.

The MME is the component that performs signaling and control functions for supporting an access for a network connection of a user equipment, allocation of network resources, tracking, paging, roaming, handover and the like. The MME controls control plane function related to subscriber and session managements. The MME manages a number of eNodeB's and performs a signaling for selecting an existing gateway for a handover into a different 2G/3G network. And, the MME performs such a function as Security Procedures, Terminal-to-network Session Handling, Idle Terminal Location Management, and the like.

The SGSN handles all packet data for user's mobility management and authentication for a different 3GPP network (e.g., GPRS network).

The ePDG plays a role as a security node for an trusteduntrusted non-3GPP network (e.g., I-WLAN, WiFi hotspot, etc.).

As mentioned in the foregoing description with reference to FIG. 5, a user equipment having IP capability can access an IP service network (e.g., IMS) provided by a service provider (i.e., an operator) via various components within the EPC based on a non-3GPP access as well as on a 3GPP access.

Moreover, FIG. 5 shows various reference points (e.g., S1-U, S1-MME, etc.). In the 3GPP system, a conceptional link for connecting 2 functions existing in different functional entities of E-UTRAN and EPC is defined as a reference point. Each of the reference points S2a and S2b shown in FIG. 5 corresponds to a non-3GPP interface. The S2a is the reference point for providing a related control and mobility support between a trusted non-3GPP access and PDNGW to a user plane. And, the S2b is the reference point for providing a related control and mobility support between ePDG and P-GW to a user plane. Moreover, the S2c is the reference point between UE (user equipment) and P-GW.

As mentioned in the foregoing description, various protocols of IETF (Internet Engineering Task Force) have been introduced as well as GTP (GPRS Tunneling Protocol). In particular, IETF protocols such as PMIPv6 (Proxy Mobile IPv6), DSMIPv6 (Dual Stack Mobile IPv6) and the like are introduced in draft version state previous to RFC (Request for Comments) of IETF and are used as significant protocols of the non-3GPP interworking in SAE specifications. Basically, for the 3GPP Inter-Radio Access Technology handover, GTP protocol is used, and IETF-based protocols are used above S2 interfaces for the non-3GPP interworking. Particularly, the reference point S5 providing a user plane tunneling) and a tunnel management between SGW and P-GW and a reference point S8 (not shown in the drawing) used for roaming are able to support both GTP and IETF-based protocol.

In case that a paging message of a cellular network is transmitted to a user equipment using WLAN, in order for the user equipment to inform the cellular network that the user equipment is currently located within a coverage of a base station, an embodiment of a method for the user equipment to periodically inform the cellular network that the user equipment accesses a WLAN AP located within the coverage of the base station through the WLAN is described as follows. For clarity of the following description, an MME is described as an entity for transmitting the paging message of the cellular network for example. And, a different network node in a wireless communication system supportive of multiple radio access networks can perform the same operation. Moreover, the network node, which transmits the paging message, can be implemented with a server or a device.

Figure 6:
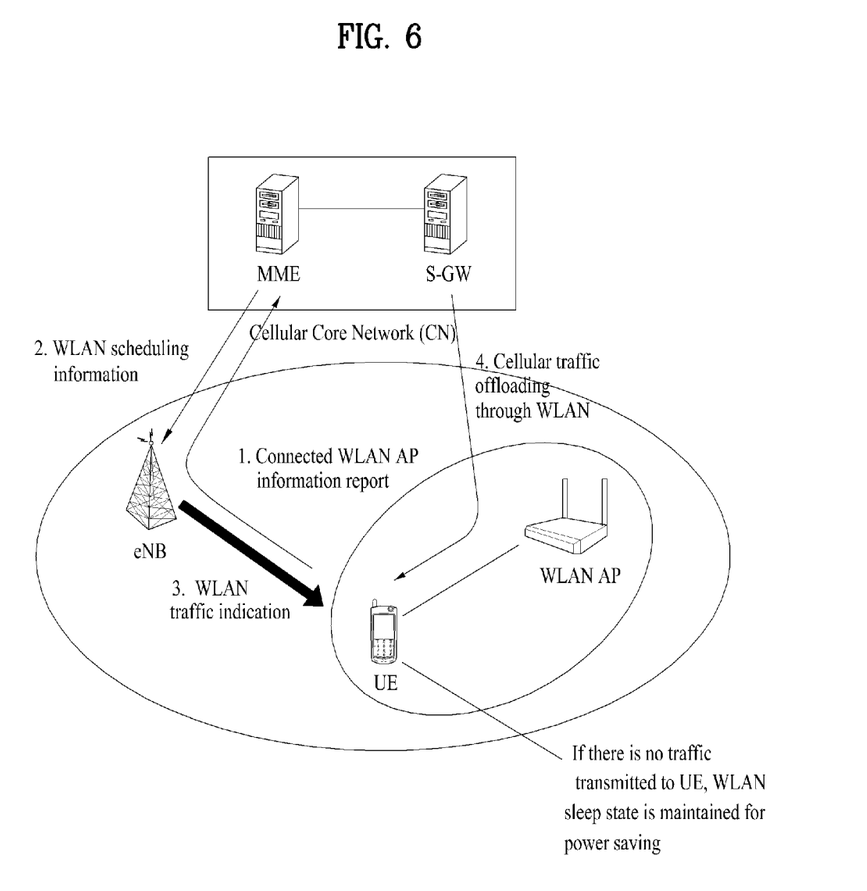
FIG. 6 is a diagram for one example of a cellular traffic offloading process according to one embodiment of the present invention.

FIG. 6 is a diagram for one example of a cellular traffic offloading process according to one embodiment of the present invention.

For clarity of the following description, FIG. 6 illustrates that only an MME (mobility management entity) and an SGW (serving gateways) are included in a mobile communication core network. Yet, as mentioned in the foregoing description, various components can be included in the mobile communication core network. In this case, the MME is a network entity that performs such a function as a connection management of a user equipment currently connected to the mobile communication core network, an interworking with a different network and the like. And, the SGW is a network entity that performs such a function as a traffic management of all user IP packets transmitted to a user equipment, a mobility anchor for the user equipment that is moving between base stations, and the like.

For clarity of the following description with reference to FIG. 6, MME and SGW are assumed as entities of a network for performing an operation for a cellular traffic offloading for example, by which the present invention is non-limited. And, a control function of a WLAN offloading of a cellular traffic can be performed by one component such as MME and SGW. Moreover, a control function of a WLAN offloading of a cellular traffic can be performed by one of various components included in a mobile communication core network as well as by MME and/or SGW.

Referring to FIG. 6, while a user equipment performs a communication by accessing a base station using a cellular communication system, if the user equipment finds an adjacent WLAN AP by receiving and searching beacon signals transmitted periodically by WLAN APs, the user equipment can access the corresponding WLAN AP by maintaining the access to the cellular network. In doing so, a process for each user equipment to access a WLAN AP may follow the former WLAN access process shown in FIG. 4.

1) A user equipment accessing a WLNA AP reports information on the accessed WLAN AP to a mobile communication core network.

2) If an MME of the mobile communication core network having received the report of the access to the WLAN from the user equipment needs to perform a traffic offloading on cellular data, which is to be transmitted to the user equipment, through a WLAN, the MME schedules that the cellular data to be transmitted through the WLAN will be transmitted to the user equipment at a prescribed timing point or in a specific time by a prescribed period and then transmits the corresponding scheduling information to a base station currently accessed by the user equipment.

3) A base station receives WLAN scheduling information on a specific user equipment from an MME. If the base station needs to transmit data of the user equipment through a WLAN according to the corresponding scheduling information, the base station sends a traffic indication message for the data transmitted through the WLAN to the user equipment. In this case, the traffic indication message may include only indication information indicating that there is data to be transmitted through the WLAN at a timing point of sending the corresponding message from the base station. In particular, if the traffic indication message includes only the indication information indicating that there is the data to be transmitted through the WLAN at the timing point, the base station sends the corresponding traffic indication message to the user equipment each timing point at which a management entity transmits the data to the user equipment through the WLAN. Moreover, the traffic indication message may include scheduling information on a transmission timing point of a data transmitted through the WLAN and/or a transmission period of a data transmitted through the WLAN in a specific time. In particular, the user equipment is able to receive the data through the WLAN to correspond to the data transmission period included in the traffic indication message. In doing so, if the transmission period of the data transmitted to the user equipment through the WLAN is changed, the base station may transmit information on the changed transmission period to the user equipment through the traffic indication message.

4) Having transmitted a WLAN scheduling information of a specific terminal to a user equipment (or a base station), a mobile communication core network transmits a cellular traffic data, which is to be transmitted at a data transmission timing point included in scheduling information previously transmitted through an SGW of the core network, through a WLAN, whereby the corresponding data can be transmitted to the user equipment through a WLAN AP currently accessed by the user equipment. In case that an SGW and an MME are separately implemented, the MME can share a scheduling information for transmitting data to a user equipment through a WLAN by interworking with the SGW.

The present invention proposes a method for a user equipment to maintain an access to a WLAN without performing a long-term transmission as well as the aforementioned method of offloading data through a WLAN. To this end, a mobile communication core network transmits a request for maintaining an access of a user equipment to a WLAN AP currently accessed by the user equipment or a management entity of the WLAN so that a connection of the user equipment can be maintained despite that the user equipment does not perform any transmission through the corresponding WLAN for a predetermined duration.

Figure 7:
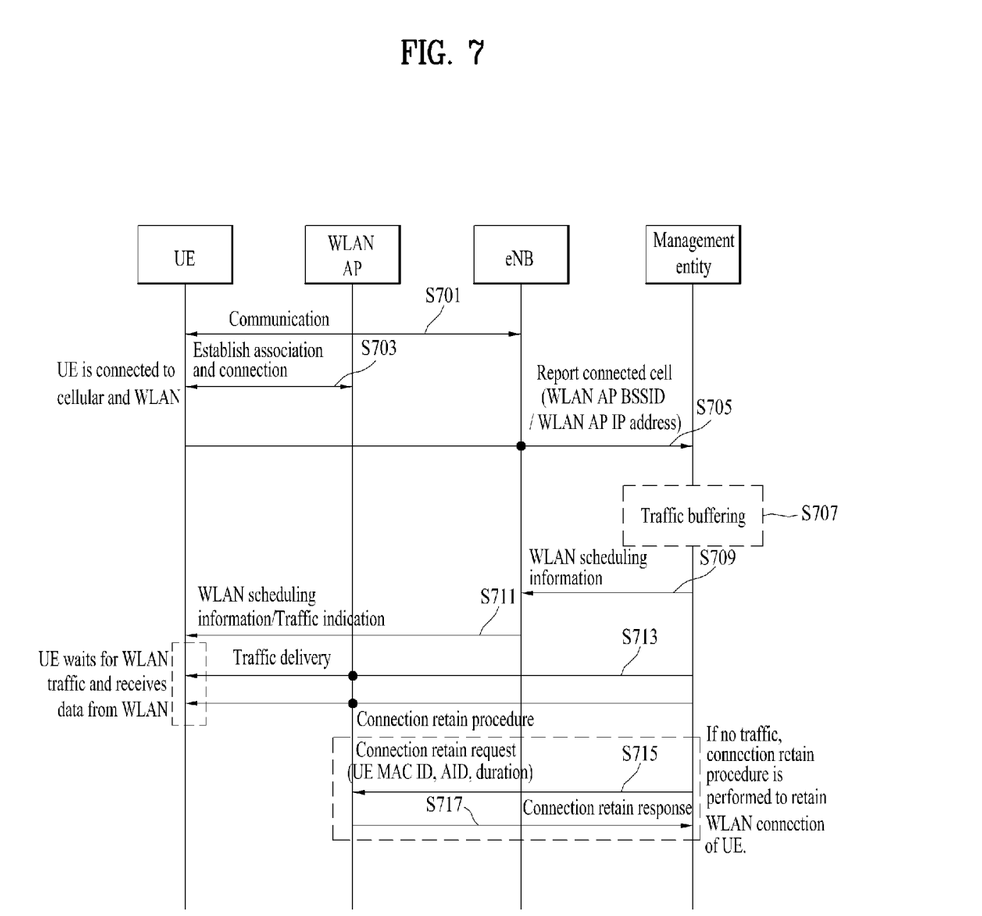
FIG. 7 is a diagram for one example of a cellular traffic offloading procedure according to one embodiment of the present invention.

FIG. 7 is a diagram for one example of a cellular traffic offloading procedure according to one embodiment of the present invention.

FIG. 7 shows that network entities (e.g., MME and SGW) of a mobile communication core network according to the former embodiment shown in FIG. 6 are integrated into a management entity. According to the present invention, a management entity means a network entity of a mobile communication core network performing a control function of WLAN offloading of cellular traffic and is non-limited to the above-described MME or SGW of the mobile communication core network.

Referring to FIG. 7, while a user equipment is performing a communication by accessing a base station through a cellular communication system [S701], if an adjacent WLAN AP is found, the user equipment is able to access the corresponding WLAN AP by maintaining an access to a cellular network [S703]. In doing so, each user equipment is able to search for a corresponding WLAN AP in a manner of searching for and receiving a beacon frame periodically transmitted by the WLAN AP.

As mentioned in the foregoing description, the beacon frame may include such information as a time stamp, a beacon interval, an AP capability, a service set identifier (SSID), supported rates and the like. The service set identifier is an identifier used to identify a plurality of different basic service sets in a WLAN system and may be named a basic service set identifier (BSSID).

Having accessed the WLAN AP, the user equipment sends a connected cell report message to a management entity of a core network through the base station [S705]. In particular, the user equipment informs the management entity that the corresponding user equipment currently accesses a specific WLAN AP through the connected cell report message. In this case, the connected cell report message includes address information of the WLAN AP accessed by the user equipment and may optionally include such information, which is required for the management entity to determine a traffic offloading for the user equipment, as signal quality information of the user equipment and the like. In this case, an address of the WLAN AP can be represented in format of 48-bit BSSID or IP address and follows the standard of IEEE 802.11 system. The BSSID may be named a MAC address. In this case, the MAC address means a 48-bit length address given to each communication device (e.g., WLAN network adaptor loaded on a device) and the corresponding address is a globally unique address.

After the management entity has received the connected cell report message from the user equipment, if data to be transmitted to the corresponding user equipment is received from such an external network as internet or is generated from an internal mobile communication network, the management entity performs a buffering on the corresponding traffic and determines whether to deliver the corresponding data to be WLAN currently accessed by the user equipment necessarily [S707]. The determination of the traffic offloading through the WLAN is made by an internal algorithm of the management entity but is not handled by the present invention. Thus, the traffic offloading through WLAN is performed if a traffic overhead of a base station accessed by a user equipment increases above (or over) a specific threshold or the WLAN is used for the reason of a communication fee charging or the like.

Having determined to perform the traffic offloading through the WLAN on the data of the user equipment, the management entity schedules that the cellular data to be transmitted through the WLAN will be transmitted to the user equipment at a prescribed timing point or in a specific time by a prescribed period and then transmits the corresponding WLAN scheduling information to the base station currently accessed by the user equipment [S709].

Having received the WLAN scheduling information from the management entity, the base station sends a traffic indication message for the data transmitted through the WLAN according to the corresponding WLAN scheduling information to the user equipment [S711].

In this case, the WLAN scheduling information on a specific user equipment may include only traffic indication information indicating that a data transmission through WLAN is performed at a corresponding timing point. And, the WLAN scheduling information on a specific user equipment may include scheduling information on a transmission timing point of data transmitted through WLAN and/or a transmission period of data transmitted through WLAN in a specific time. In this case, if the traffic indication message includes only the information indicating that the data transmission through the WLAN is performed, the step S711 can be repeated each time the data to be delivered to the user equipment is present.

Having transmitted the WLAN scheduling information to the user equipment, the management entity delivers the data buffered in the step S707 to the user equipment through the WLAN accessed by the user equipment in accordance with the scheduling information determined in the step S709 [S713]. In particular, the management entity can transmit the corresponding data to the user equipment through the corresponding WLAN AP by transmitting the data to the WLAN AP at the address reported by the user equipment as currently accessed through the connected cell report message in the step S705.

In this case, if the aforementioned traffic indication message includes only the information indicating that the data transmission through the WLAN is performed, the step S711 and the step S713 can be performed each time data to be transmitted to the user equipment is present. In particular, the step S711 and the step S713 can be performed at the same timing point.

If the aforementioned traffic indication message includes the scheduling information on a transmission timing point of data transmitted through WLAN and/or a transmission period of data transmitted through WLAN in a specific time, the step S713 may be performed at the timing point according to the scheduling information.

When a traffic offloading through a WLAN is performed by the method mentioned in the foregoing description, traffic data for a specific user equipment, which is to be transmitted through the WLAN, may not be generated continuously. In this case, since the user equipment needs not to transceive data through the WLAN, it stops the WLAN operation by enabling a WLAN receiver and a WLAN transmitter to enter a sleep state. If a term having no data transceiving between a WLAN AP and a user equipment increases long, the WLAN AP brings an expiration of a connection to the corresponding user equipment and releases information and resource related to the connection to the corresponding user equipment. Since the time of the expiration of the connection between the WLAN AP and the user equipment may be shorter than a period (e.g., a transmission period of data transmitted through WLAN to the corresponding user equipment) required for performing a cellular traffic offloading operation, a method for retaining the connection between the user equipment and the WLAN AP is necessary.

To this end, if the WLAN traffic offloading for the user equipment does not occur in a WLAN connection expiration time for the user equipment, the management entity sends a connection retain request message to the WLAN AP [S715]. In doing so, the management entity periodically sends the connection retain message to the WLAN AP by a period shorter than the WLAN connection expiration time, thereby controlling the connection between the corresponding WLAN AP and the corresponding user equipment not to expire in the course of performing the data offloading through the WLAN AP.

Moreover, the connection retain request message contains a time information for retaining the connection between the corresponding WLAN AP and the corresponding user equipment so that the connection between the WLAN AP and the user equipment may not expire during the time contained in the connection retain request message.

In addition, the connection retain request message may contain at least one of a MAC address of the user equipment and information on an AID (association ID) between the WLAN AP and the user equipment. The MAC address of the user equipment or the AID information follows the standard of IEEE 802.11 system.

Having received the connection retail request message from the management entity, the WLAN AP sends a connection retain response message to the management entity in response to the received message [S717]. The connection retain response message contains information indicating whether to accept the retaining of a connection to a specific user equipment. If the WLAN AP declines the retaining of the connection to the specific user equipment through the connection retain response message, the management entity can transmit the data for the corresponding user equipment through the cellular network again from a timing point of an expiration of the connection between the corresponding WLAN AP and the corresponding user equipment.

3. The General of Invention Applicable Devices

Figure 8:
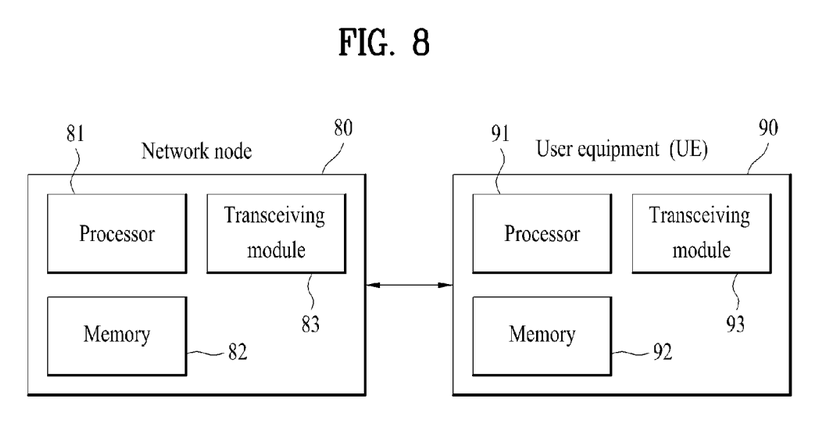
FIG. 8 is a block diagram of a configuration of a wireless communication device according to one embodiment of the present invention.

FIG. 8 is a block diagram for a configuration of a wireless communication device according to one embodiment of the present invention.

Referring to FIG. 8, a wireless communication system includes a network node 80 and a plurality of user equipments 90 located in the wireless communication system.

The network node 80 includes a processor 81, a memory 82 and a transceiving module 83. The processor 81 implements the functions, processes and/or methods proposed by the present invention. Layers of a radio interface protocol can be implemented by the processor 81. The memory 82 is connected to the processor 81 and stores various kinds of information for driving the processor 81. The transceiving module 83 is connected to the processor 81 and then transmits and/or receives radio signals.

The user equipment 90 includes a processor 91, a memory 92 and a transceiving module 93. The processor 91 implements the functions, processes and/or methods proposed by the present invention. Layers of a radio interface protocol can be implemented by the processor 91. The memory 92 is connected to the processor 91 and stores various kinds of information for driving the processor 91. The transceiving module 93 is connected to the processor 91 and then transmits and/or receives radio signals.

The memory 82/92 may be included inside or outside the processor 81/91 and then connected to the processor 81/91 via a means known well to the public. Optionally, the network node 80 and/or the user equipment 90 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A data transceiving method in a wireless access system according to the present invention is mainly described with reference to the examples of applying to 3GPP LTE system and IEEE 802 system and may be applicable to various kinds of wireless access systems as well as to 3GPP LTE system and IEEE 802 system.

What is claimed is:

1. A method for offloading data by a management entity in a wireless access system supportive of a multi-radio access network, comprising:
   receiving, by the management entity from a user equipment via a cellular network base station that is accessed by the user equipment, a connected cell report message containing an identifier of a WLAN (wireless local area network) AP (access point) being accessed by the user equipment;
   simultaneously buffering, by the management entity, data received from an external network and determining whether to transmit the data to the user equipment through the WLAN AP;
   transmitting, by the management entity to the base station, scheduling information about a transmission timing of the data, when the management entity determines the data is to be transmitted to the user equipment through the WLAN AP;
   transmitting, by the management entity, the data to the user equipment through the WLAN AP in accordance with the scheduling information,
   wherein a connection between the cellular network base station and the user equipment is maintained by the management entity when the user equipment accesses the WLAN AP; and
   sending a connection retain request message indicating to retain a connection between the user equipment and the WLAN AP,
   wherein the connection retain request message is transmitted at a period shorter than a WLAN connection expiration time.

2. The method of claim 1, wherein the connection retain request message comprises time information for retaining the connection between the user equipment and the WLAN AP.

3. The method of claim 1, wherein the connection retain request message further comprises a MAC (media access control) address of the user equipment and an association identifier (AID) between the user equipment and the WLAN AP.

4. The method of claim 1, further comprising:
receiving a connection retain response message indicating whether to accept to retain the connection to the user equipment from the WLAN AP in response to the connection retain request message.

5. The method of claim 1, wherein the identifier of the WLAN AP comprises an IP (internet protocol) address of the WLAN AP or a basic service set identifier (BSSID) of the WLAN AP.

6. An apparatus for offloading data in a wireless access system supportive of a multi-radio access network, the apparatus comprising:
a transceiving module configured to transceive wire/wireless signals; and
a processor configured to
receive, from a user equipment via a cellular network base station that is accessed by the user equipment, a connected cell report message containing an identifier of a WLAN (wireless local area network) AP (access point) being accessed by the user equipment, simultaneously buffer data and determine whether to transmit the data to the user equipment through the WLAN AP,
transmit, to the base station, scheduling information about a transmission timing of the data to the user equipment when the management entity determines the data is to be transmitted to the user equipment through the WLAN AP,
transmit the data to the user equipment through the WLAN AP in accordance with the scheduling information,
wherein a connection between the cellular network base station and the user equipment is maintained by the management entity when the user equipment accesses the WLAN AP, and
send a connection retain request message indicating to retain a connection between the user equipment and the WLAN AP,
wherein the connection retain request message is transmitted at a period shorter than a WLAN connection expiration time.

* * * * *